United States Patent

Brandt

[15] 3,642,040
[45] Feb. 15, 1972

[54] WORKPIECE-SENSING MILLING APPARATUS

[72] Inventor: Heinrich Brandt, Leipziger Strasse 6, 492 Lemgo/Lippe, Germany

[22] Filed: June 1, 1970

[21] Appl. No.: 42,204

[30] Foreign Application Priority Data

Mar. 20, 1970 Germany .................... P 20 13 309.9

[52] U.S. Cl. .................. 144/139, 144/154, 144/144, 90/13.9, 90/13.5
[51] Int. Cl. ..................................................... B27c 5/02
[58] Field of Search ............... 144/154, 139, 144, 134, 3; 90/13, 13.5, 13.9

[56] References Cited

UNITED STATES PATENTS

| | | | |
|---|---|---|---|
| 1,921,715 | 8/1933 | Whitney et al. | 144/154 |
| 2,599,712 | 6/1952 | Izen | 144/144 X |
| 3,547,002 | 12/1970 | Walter | 144/144 R |

*Primary Examiner*—Donald R. Schran
*Attorney*—Michael S. Striker

[57] ABSTRACT

A plate, which has a rectangular rim with rounded corners, and a band bonded to the rim and projecting with edge portions from the same, is machined along the rim by a pair of coaxial milling cutters which remove the projecting edge portions of the band. The milling cutters are supported by tool carriers which are mounted on a frame which is tiltable about the axis of the cutters, and is angularly displaced at the rounded corners of the plate due to the engagement of the rim by an abutment face of an abutment member secured to the frame. Feeler rollers, mounted on the tool carriers, determine the correct working positions of the cutters by engaging opposite sides of the plate, and turn with the frame and tool carriers.

11 Claims, 4 Drawing Figures

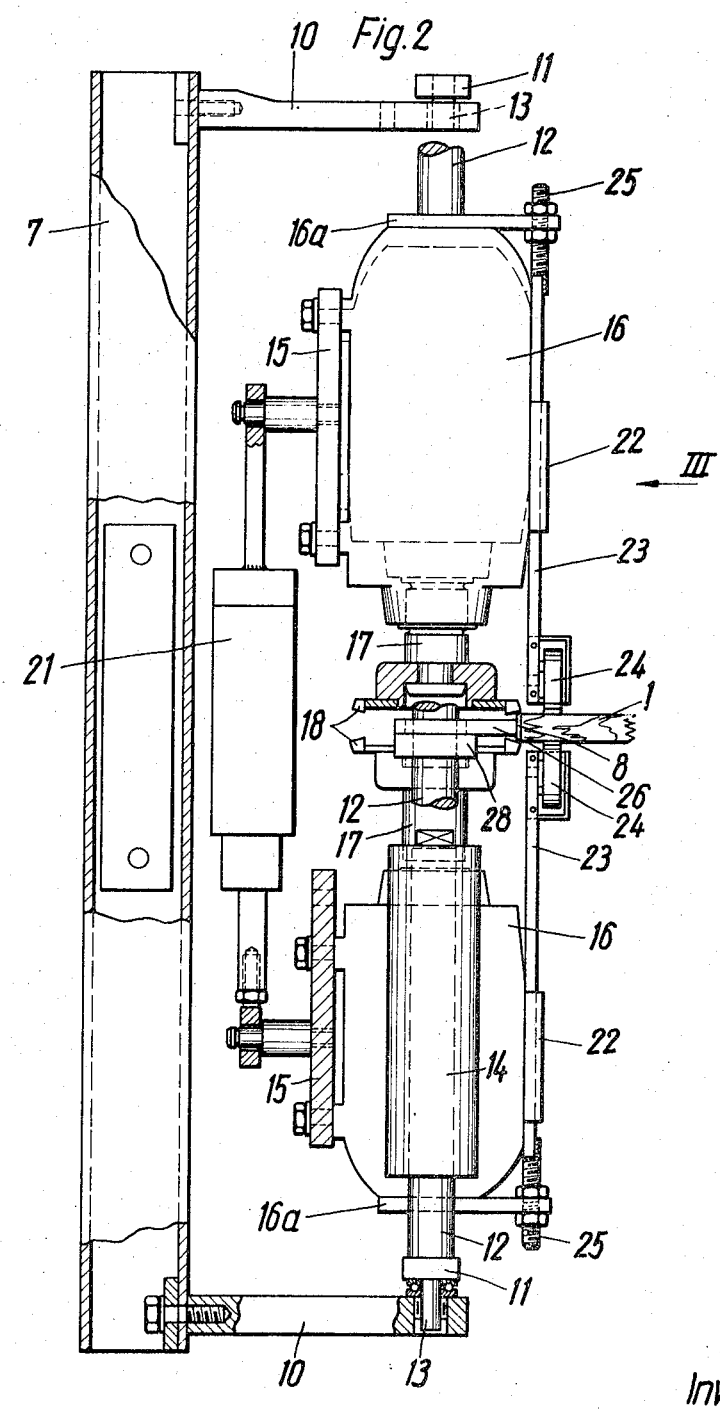

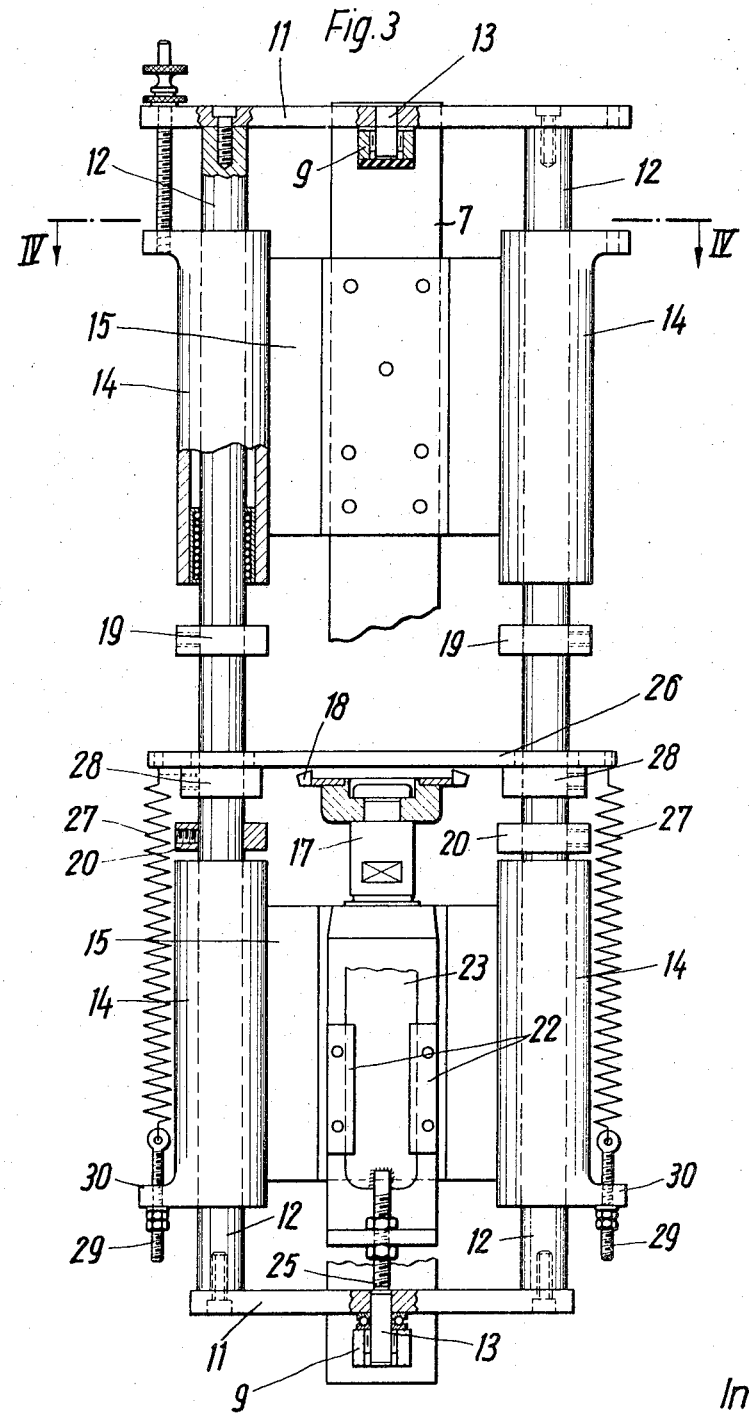

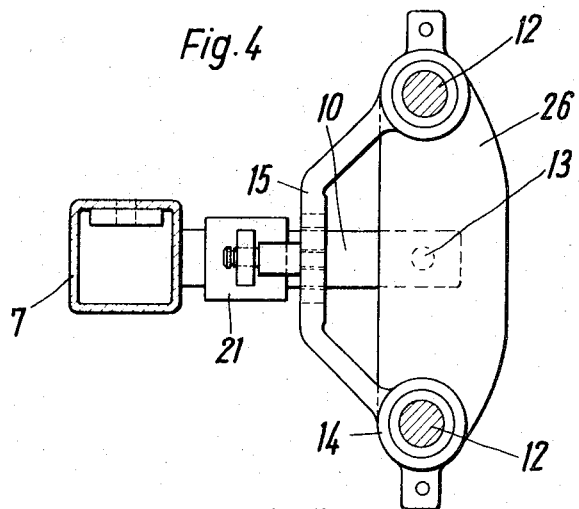
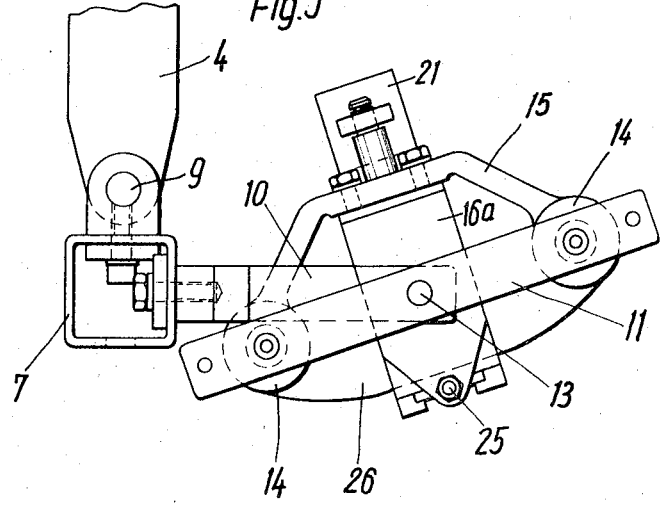

3,642,040

WORKPIECE-SENSING MILLING APPARATUS

BACKGROUND OF THE INVENTION

It is known to provide the peripheral rims of plate-shaped workpieces, such as table tops, with bands of a synthetic material, or consisting of special wood. The bands or strips are continuously bonded to the peripheral rim of the workpiece, and must be somewhat wider than the thickness of the workpiece and the width of the peripheral rim of the same. Consequently, edge portions of the band project beyond the top and bottom faces of the plate-shaped workpiece by a small margin, and it is necessary to remove the marginal edge portions of the band by milling, tools which are generally manually operated by experienced workmen.

It has been proposed to provide a power operated milling apparatus for removing the edge portions of the band, and in the apparatus of the prior art, a milling tool is moved transversely to the plane of the plate-shaped workpiece. The tool carriers of the milling tool are provided with a feeler roller engaging the workpiece. The apparatus of the prior art is suitable only for milling the edges of rectangular workpieces with straight sides and sharp corners.

SUMMARY OF THE INVENTION

It is one object of the invention to provide a milling apparatus for the above-explained purpose which permits, in addition to the treating of circular or oval workpieces, also the treating of rectangular workpieces which have rounded edges.

A related object of the invention is to provide a milling apparatus for milling the noncircular rim of a plate-shaped workpiece rotating about an axis transverse to the top and bottom faces of the workpiece.

Another object of the invention is to provide a power-driven milling apparatus in which the milling tool means are operated in such a manner that a running off of a feeler roller in the region of the rounded edges of a rectangular or triangular workpiece is avoided.

Another object of the invention is to provide a milling apparatus in which damage to the workpiece by milling cutters removing edge portions of a peripheral band, is prevented.

In accordance with the invention, the milling tool means are mounted on a rigid frame which is turnable about a vertical axis and has an abutment member engaging the rim of the workpiece with the band thereon for orienting and angularly positioning the frame with the milling tool means. The milling tool means, and feeler means, are mounted on tool carrier means which are movable in axial direction, and the axis of rotation of the milling tool means coincides with the axis about which the frame with the milling tool means and feeler rollers is angularly displaced.

The axis of the feeler roller is preferably at right angles to the abutment face of the abutment member. In this manner, the result is obtained that the feeler roller moves exactly parallel to the periphery of the workpiece, even if rounded edges of rectangular workpieces are milled, so that the feeler rollers cannot run off the workpiece even if the corners of the same have a very small radius of curvature. Consequently, damage to the workpiece by the milling tool means is reliably prevented.

One embodiment of the invention comprises means for supporting and for rotating about an axis, a workpiece having a peripheral noncircular rim with at least one edge portion projecting from the workpiece; supporting means, preferably including a supporting arm, biassed toward the rim and the workpiece axis; a frame mounted on the biassed supporting means for angular movement about the main axis parallel to the workpiece axis, and including guide means, preferably a pair of vertical guide rods, parallel to a main axis; an abutment means mounted on the frame, preferably on the guide rods, and having an abutment face abutting the rim of the workpiece due to the action of the biassed supporting means on the frame; tool carrier means mounted on the guide means for movement in axial direction toward and away from the abutment means and the workpiece; operating means for moving the tool carrier means; rotary milling tool means, preferably two milling cutters respectively mounted on two tool carriers, for rotation about the main axis and being movable with the carriers in axial direction toward and away from each other; and feeler means, preferably a pair of feeler rollers engaging the top and bottom faces of the workpiece, being mounted on the tool carriers for movement with the same, and stopping movement of the tool carriers and of the milling cutters when engaging the workpiece.

In this operative position, in which the milling cutters engage the projecting edge portions of the band on the rim of the workpiece for removing the edge portions continuously during rotation of the workpiece, the abutment face assumes a position tangential to the portions of the rim engaged thereby, so that the entire frame with the milling tool is turned to corresponding positions, and the desired relationship between the milling cutters and the workpiece is maintained even at sharply rounded corners of the workpiece.

In the preferred embodiment of the invention, the abutment face of the abutment member has a straight planar central portion normally abutting the band and the rim of the workpiece, and rounded off end portions which facilitate angular movement of the frame at the corners of the workpiece.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a side elevation, partially in vertical section, illustrating the milling apparatus on an enlarged scale;

FIG. 3 is a front view of the milling apparatus as viewed in the direction of the arrow III in FIG. 2;

FIG. 4 is a cross-sectional view taken on line IV—IV in FIG. 3; and

FIG. 5 is a fragmentary plan view of the milling apparatus shown in FIGS. 2 and 3, with the tool supporting frame shown in a displaced position.

DESCRIPTION OF THE PREFERRED EMBODIMENT

Figure 1:
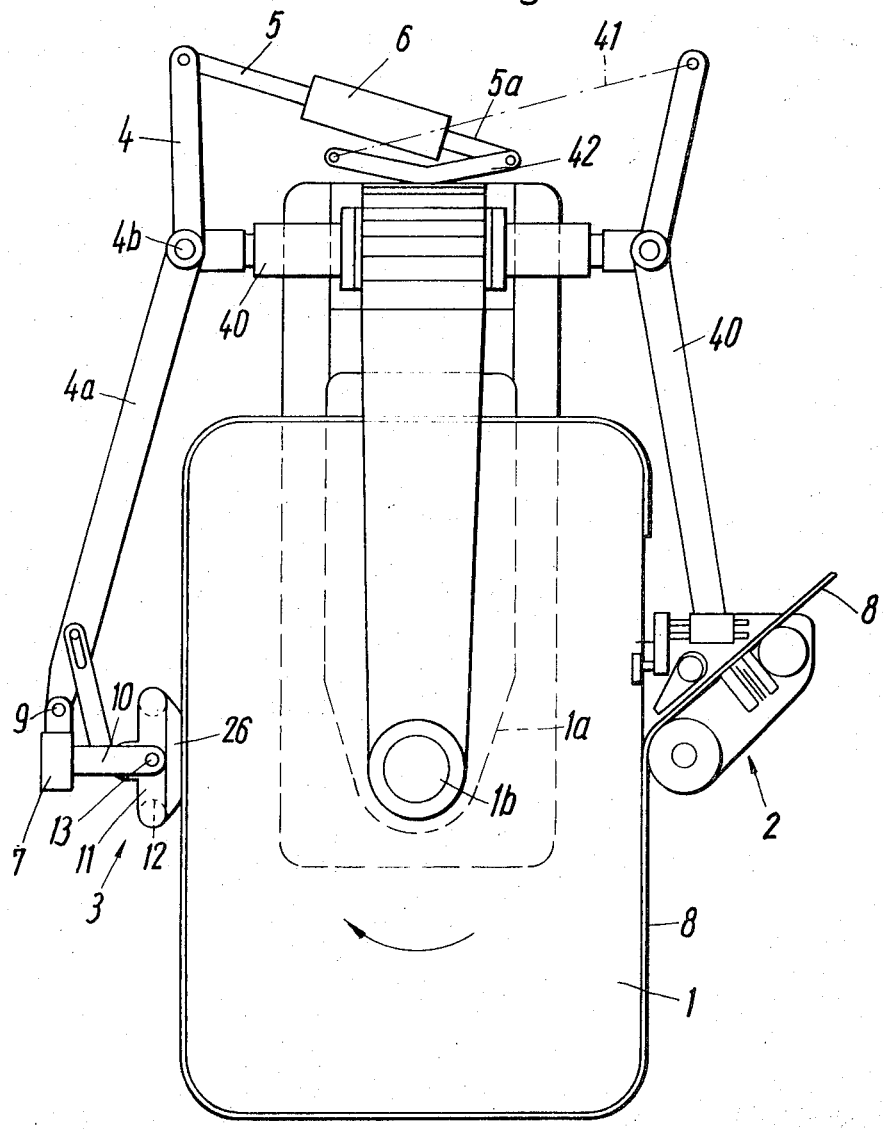
FIG. 1 is a schematic plan view illustrating a milling apparatus according to the invention cooperating with a rectangular workpiece to which a band is continuously applied.

Referring first to FIG. 1, a rectangular workpiece 1 having rounded corners in its rectangular peripheral rim, is clamped between two horizontal members 1a and is rotated by a motor, not shown, mounted on the shaft 1b of the upper clamping means 1a. During rotation of the workpiece about the axis of shaft 1b, a band 8 consisting of a synthetic material, or of a special wood, is glued or otherwise bonded by a bonding device 2 in a manner which is known, and not an object of the present invention. For manufacturing reasons, the band 8 is somewhat wider than the width of the peripheral rim of workpiece 1, so that the two edge portions of the band, slightly project beyond the top and bottom faces of the tabletop 1. The milling apparatus, generally designated by reference numeral 3, removes the two edge portions of band 8 during continuous rotation of the workpiece, the tabletop 1, so that the milling apparatus 3 not only engages with the respective milling tools, the straight lateral edges of the workpiece, but also the rounded corners of the same.

The milling apparatus 3, which is the object of the invention and illustrated in detail and on a larger scale in FIGS. 2 to 5, is mounted for limited angular movement on a pivot means 9 at the free end of the arm 4a of an angular supporting lever 4 which is mounted on a pivot 4b on a supporting means 40 which also carries an angular lever 40 on which the band-applying and bonding device 2 is mounted. Linkage means 41, 42 connect supporting arm 40 with the piston rod 5a of a hydraulic motor 6 whose other piston rod 5 is articulated to the end of the angular supporting arm 4. By applying hydraulic pressure to the piston in cylinder 6, the support arms 4a and 40 are turned in such a direction that the bonding device 2 and the milling apparatus 3 are biassed toward the rim of workpiece 1 in the direction toward the axis of the workpiece.

As best seen in FIG. 5, the biassed supporting arm 4 carries a vertical beam 7 having a rectangular cross section on pivot means 9.

As best seen in FIG. 2, two supporting arms 10 are secured to the ends of the vertical support beam 7. On the free ends of support arms 10, pivot means 13 are respectively mounted which are connected to the center portions of a pair of end members 11, as best seen in FIG. 3. The end members 11 are connected with each other by two vertical guide rods 12 and form with the same a rigid rectangular frame which is mounted for angular movement about the main axis provided by pivot means 13 relative to the support beam 7, for example between the positions shown in FIGS. 4 and 5. As is apparent from FIG. 1, the main axis defined by pivot means 13 is parallel to the axis about which workpiece 1 rotates, and also parallel to the axis of pivot means 9. An abutment member 26, best seen in FIGS. 3 and 4, has two openings through which guide rods 12 pass, so that abutment member 26 is movable along the same. A pair of springs 27 is secured to the ends of abutment member 26, and to threaded adjusting means which are screwed into brackets 30 on tubular portions 14 of a slide 15. Due to the tension of springs 27, abutment member 26 abuts rigid stops 28 in the form of flanges on guide rods 12.

A second slide 15 with tubular members 14 is mounted on the upper portions of guide rods 12, and is limited in its downward movement by stops 19 on guide rods 12. Corresponding stops 20 limit the upward movement of the lower slide 15, 14.

The two slides 15 are connected by a hydraulic or pneumatic motor 21, best seen in FIG. 2, by which the slides can be moved toward each other and away from each other along the guide rods 12.

Each slide 15 carries an electromotor 16 having a shaft 17 coaxial with the main axis of frame 11, 12 defined by pivot means 13. The adjacent inner ends of the motor shaft 17 carry crown milling tools 18. Due to the provision of the stop means 19 and 20, which are adjustable on guide rods 12, the inner end position of the milling tools 18 is defined so that the same cannot engage each other and remain sufficiently spaced on opposite sides of the abutment member 26, as best seen in FIG. 2.

The two tool carrier means 15, 14, 16 respectively support the two milling cutters 18 for rotation about the main axis of the milling apparatus, and are moved toward and away from each other by the operating means 21.

The outer ends of motors 16 carry brackets 16a on which supporting rods 23 are adjustably mounted by means of threaded end portions meshing with threaded bores in brackets 16a.

The adjacent inner ends of support rods 23 carry horizontal shafts on which feeler rollers 24 are mounted for rotation about parallel axes substantially perpendicular to the abutment face of abutment member 26, as best seen in FIG. 2. When the tool carriers 15, 16 are moved toward each other by the operating motor 21, the feeler rollers 24 engage the opposite top and bottom faces of tabletop 1, and roll on the same during rotation of workpiece 1.

Since the milling tools 18 are also supported by the tool carriers 15, 16, the position of the feeler rollers 24 determines the distance between the milling tools 18, and by adjustment of the adjusting means 25, the desired position of the milling cutters 18 for removing the projecting edge portions of band 8, is assured.

Abutment member 26 remains always at the level of the workpiece 1 due to the provision of the stops 28 on guide rods 12, springs 27 permitting movement of the lower tool carrier 15, 16 along guide rods 12. The tension of springs 27 can be adjusted by returning the threaded members 29 in the threaded holes of brackets 30.

The abutment face of abutment member 26, which is preferably formed by a layer having a low friction coefficient and consisting of a synthetic material, has a central straight portion, and two rounded end portions, as best seen in FIGS. 4 and 5.

When abutment member 26 engages the longitudinal straight portions of the rim of workpiece 1, as shown in FIG. 1, frame 11, 12 remains in the position shown in FIG. 4. When the abutment face of abutment member 26 engages, during rotation of the workpiece, a corner portion of the rim and the respective portion of band 8, frame 11, 12 is angularly tilted about pivot 13, together with motors 16 and feeler rollers 24 so that the milling cutters and feeler rollers move parallel to the periphery of the workpiece even at the rounded corners of the same, and the running off of the feeler rollers is not possible.

It will be understood that each of the elements described above, or two or more together, may also find a useful application in other types of milling apparatus differing from the types described above.

While the invention has been illustrated and described as embodied in a milling apparatus for milling projecting edge portions of a band attached to the noncircular rim of a table top having rounded corners, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Workpiece-sensing milling apparatus comprising means for supporting and for rotating about an axis a workpiece having a peripheral noncircular rim with an edge portion projecting from said workpiece; supporting means biassed toward said rim and said workpiece axis; a frame mounted on said biassed supporting means for angular movement about a main axis parallel to said workpiece axis, and including guide means parallel to said main axis; an abutment means mounted on said frame for angular movement therewith, and having an abutment face abutting said rim due to the action of said biassed supporting means on said frame; tool carrier means mounted on said guide means for movement in axial direction toward and away from said abutment means and said workpiece; operating means for moving said tool carrier means; rotary milling tool means mounted on said tool carrier means for rotation about said main axis and being movable with said carrier means in axial direction; and feeler means mounted on said tool carrier means for movement with the same and stopping movement of said tool carrier means and said milling tool means when engaging said workpiece in an operative position in which said milling tool means engage said projecting edge portion for removing the same continuously during rotation of said workpiece while said abutment face assumes a position tangential to the portion of said rim engaged thereby and turns said frame and milling tool means to corresponding positions.

2. Milling apparatus as claimed in claim 1 wherein said feeler means include roller means having an axis substantially perpendicular to said abutment face.

3. Milling apparatus as claimed in claim 1 wherein said milling tool means include crown milling cutter means rotatable about said main axis; and wherein said tool carrier means include electromotor means having stator means mounted on said guide means for movement along the same and rotor means connected with said milling cutter means for rotating the same.

4. Milling apparatus as claimed in claim 1 wherein said tool carrier means include adjustable means for mounting said feeler means adjustably in the direction of said main axis so that the relative position between said feeler means and said milling tool means can be adjusted in axial direction.

5. Milling apparatus as claimed in claim 1 wherein said abutment face has a straight planar central portion and rounded off end portions.

6. Milling apparatus as claimed in claim 1 wherein said abutment means has a layer of a low friction material on said abutment face.

7. Milling apparatus as claimed in claim 1 wherein said rim is surrounded by a band bonded thereto in a position in which edge portions of said band project from said rim on opposite sides of said workpiece; wherein said frame includes a pair of end members, and said guide means include a pair of guide rods parallel to said main axis, and connected at the ends thereof by said end members; wherein said supporting means include pivot means mounting said end members and thereby said frame for angular movement about said main axis; wherein said abutment means includes an abutment member having end portions mounted on said guide rods, respectively, spaced from said end members; wherein said tool carrier means include first and second tool carriers mounted on said guide rods for movement along the same and having confronting inner ends located in the proximity of said abutment member; wherein said milling tool means include two milling cutters mounted on said confronting inner ends of said tool carriers, respectively, for engaging said projecting edge portions of said band, respectively; and wherein said feeler means include two feeler rollers mounted on said two tool carriers, respectively, for engaging said workpiece on opposite sides when said milling cutters engage said edge portions, said feeler rollers having parallel axes substantially perpendicular to said abutment face.

8. Milling apparatus as claimed in claim 7 wherein said first and second tool carriers include slides mounted on said guide rods, and electromotors having stators mounted on said slides, respectively, for movement with the same along said guide rods, and rotors rotatable about said main axis and connected with said milling cutters for rotating the same about said main axis.

9. Milling apparatus as claimed in claim 8 wherein said frame includes adjustable stop means mounted on said guide rods adjustably in axial direction and engaging said slides, respectively, in inner end positions for limiting movement of said milling cutters toward each other.

10. Milling apparatus as claimed in claim 7 wherein said feeler means include two supports for supporting said two feeler rollers on said tool carriers, respectively; and feeler adjusting means for adjusting the positions of said supports and thereby of said feeler rollers in axial direction in accordance with the thickness of the workpiece.

11. Milling apparatus as claimed in claim 7 wherein said operating means include servomotor means having a cylinder and a piston respectively connected to said first and second tool carrier for moving the same simultaneously in opposite axial directions along said guide rods.

* * * * *